Jan. 20, 1942.        H. G. RORABAUGH        2,270,605
                          STRAINER
                    Filed June 16, 1939

H. G. Rorabaugh
INVENTOR.

BY C. A. Snow & Co.

ATTORNEYS.

Patented Jan. 20, 1942

2,270,605

UNITED STATES PATENT OFFICE 2,270,605

STRAINER

Harold G. Rorabaugh, Otis, Colo.

Application June 16, 1939, Serial No. 279,540

1 Claim. (Cl. 210—159)

This invention relates to milk strainers, the primary object of the invention being to provide means whereby the milk pad used in strainers, will be supported in such spaced relation with the bottom of the strainer as to insure the maximum straining qualities of the strainer.

An important object of the invention is to provide a strainer support which is bulged or dome-shaped, to the end that the strainer pad mounted thereon is held spaced from the perforated bottom of the strainer.

Another important object of the invention is to provide an upper perforated plate used in conjunction with the dome-shaped screen, and between which the strainer felt is held, the strainer felt support and strainer felt holder being constructed of wire mesh material, thereby providing a greater straining capacity than is afforded by the usual perforated metal bottom of strainers now in common use.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
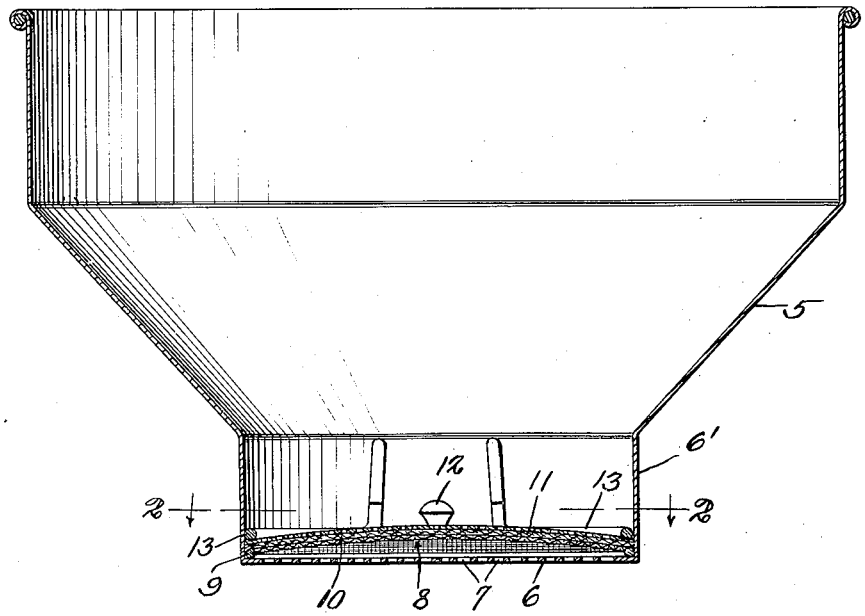
Figure 1 is a vertical sectional view through a strainer constructed in accordance with the invention.
Figure 2:
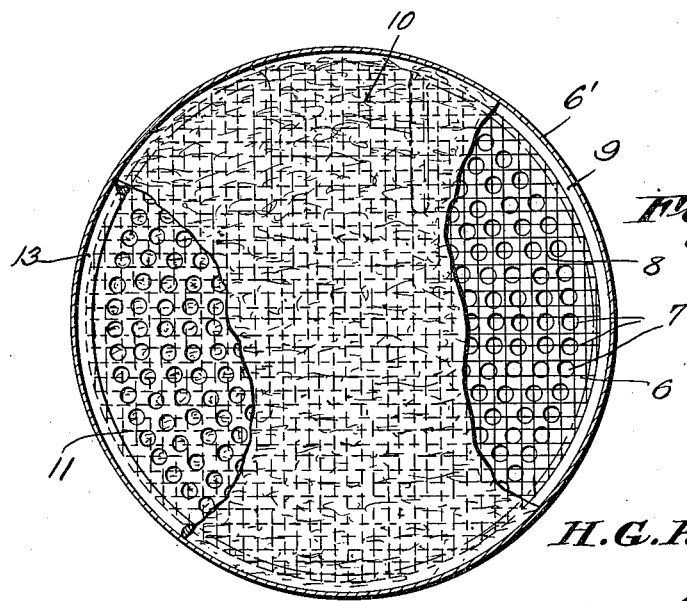
Figure 2 is a transverse sectional view taken on line 2—2 of Figure 1, parts of the lowermost strainer support and strainer pad being shown as broken away.

Referring to the drawing in detail, the body portion of the strainer is indicated generally by the reference character 5, and comprises a neck 6', the general construction of the body portion being such as to permit the body portion to be positioned in the mouth of a milk can, into which the milk is being poured.

As shown, the neck of the body portion is shown as formed with a plate 6 having perforations 7, through which the milk being strained, passes. Fitted within the neck of the body portion, and resting on the plate 6, is the dome-shaped screening member 8 which has its periphery secured to the ring 9 which is of a diameter to closely fit within the neck 6' of the body portion. As shown, the edge of the screening member 8 lies close to the plate 6, while the central or intermediate portion thereof is spaced an appreciable distance from the central portion of the plate, providing a bulged or dome-shaped structure.

The straining felt 10, which is well known construction, rests directly on the screening member 8, the straining felt or pad being supported in spaced relation with the plate, to prevent the straining felt or pad from being forced against the plate 6 to obstruct the passage of the milk through the openings 7 thereof.

Resting directly on the straining felt or pad 10, is the dome-shaped holding disk 11, which is formed with a plurality of openings, so that milk may pass through the disk 11.

A knob indicated at 12 is formed centrally of the plate 11, and affords means whereby the plate may be readily lifted from its position within the neck of the body portion, when it is desired to remove the straining felt or pad to replace it.

The reference character 13 designates a split retaining ring which has its ends extending upwardly to be gripped by the thumb and forefinger of the operator, to contract the ring and permit the ring to be removed easily. It is obvious that when the ring has been positioned, and the finger pieces thereof released, the spring will expand into close engagement with the inner surface of the neck 6' of the body portion, securely holding the various elements of the strainer, in position.

From the foregoing it will be seen that due to the construction shown and described, I have provided a strainer wherein the straining felt or pad is supported in suitable spaced relation with the bottom plate or strainer of the body portion of the device, to insure against the pad being forced into engagement with the plate to obstruct the opening thereof.

What is claimed is:

A strainer comprising a funnel-shaped body portion having a neck, a perforated disk closing the lower end of the neck, a circular screening member positioned within the neck, the circular screening member being bulged upwardly, the outer edge of the screening member resting on the perforated disk at the periphery thereof, a disk-like felt pad resting on the screening member and conforming to the shape of the screening member, an upwardly bulged perforated holding disk of a diameter to engage the neck of the body portion, positioned on the felt pad and adapted to press the felt pad into engagement with the screening member throughout the entire surface thereof, and a split yieldable retaining ring positioned on the perforated holding disk and adapted to expand into frictional engagement with the neck of the body portion, securing the screening member, pad and retaining ring in position.

HAROLD G. RORABAUGH.